(12) United States Patent
Agar et al.

(10) Patent No.: US 7,483,171 B2
(45) Date of Patent: Jan. 27, 2009

(54) DETERMINING INVERSE TRANSFER FUNCTIONS OF OUTPUT DEVICES HAVING LIMITED BIT DEPTH

(75) Inventors: Ufuk Agar, Istanbul (TR); Miheer Bhachech, Mountain View, CA (US); Gabor Herman, New York, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 847 days.

(21) Appl. No.: 10/940,076

(22) Filed: Sep. 13, 2004
(Under 37 CFR 1.47)

(65) Prior Publication Data

US 2006/0055946 A1    Mar. 16, 2006

(51) Int. Cl.
*G06F 15/00* (2006.01)

(52) U.S. Cl. .......... 358/1.9; 358/518; 358/525; 358/538; 358/2.1
(58) Field of Classification Search ............. 358/518, 358/1.9, 525, 538, 2.1
See application file for complete search history.

(56) References Cited

U.S. PATENT DOCUMENTS 6,714,319 B1 * 3/2004 Thieret et al. ............. 358/1.9
6,956,672 B1 * 10/2005 Huang et al. ............. 358/1.9

\* cited by examiner

*Primary Examiner*—Houshang Safaipour
*Assistant Examiner*—Michael Burleson

(57) ABSTRACT

An inverse transfer function of a limited bit depth output device having N primary colorants (e.g., a six-color printer) is determined. An N-dimensional hypercube that has been tessellated into a set of simplices is accessed, and the set of simplices is navigated through to select a subset that defines a one-to-one mapping of device-independent color space to device primary space.

35 Claims, 7 Drawing Sheets

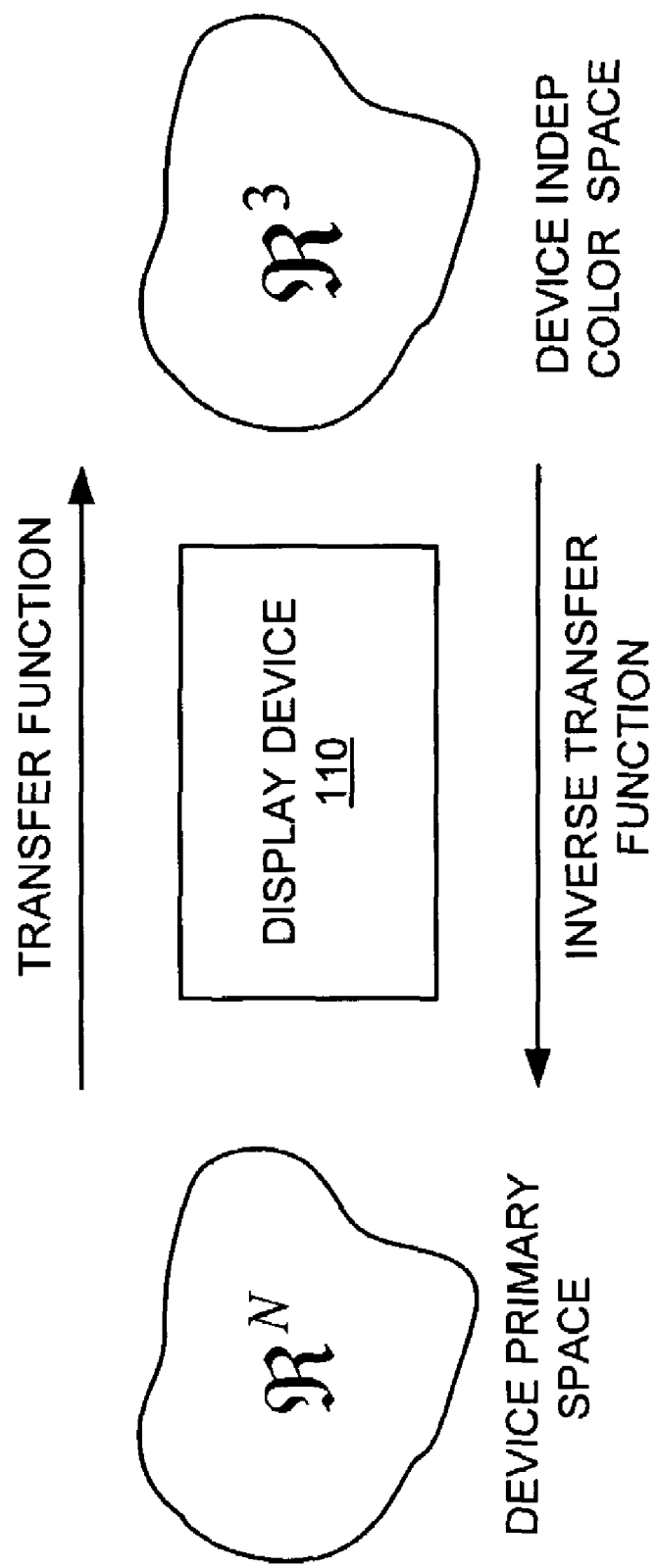

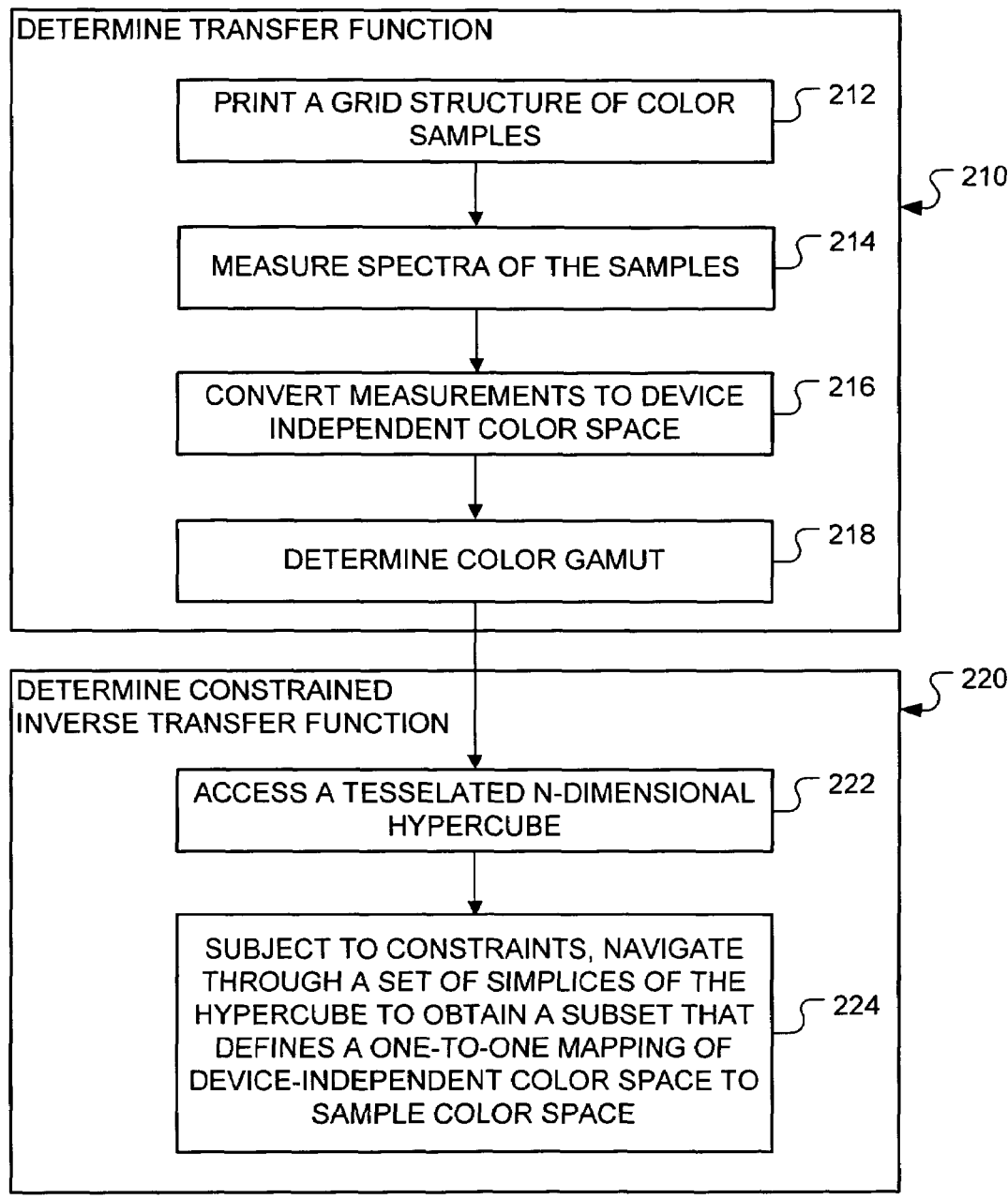

DETERMINING INVERSE TRANSFER FUNCTIONS OF OUTPUT DEVICES HAVING LIMITED BIT DEPTH

BACKGROUND

Printers and certain other output devices having limited bit depth can only produce a limited number or level of primaries per location. Consider, for example, a printer that prints with cyan (C), magenta (M), yellow (Y), black (k) inks. If the printer has limited bit depth of 1, at a certain location it can deposit only $2^1$ (i.e., 2) levels of primaries. Either the printer deposits a full level (a dot of ink) or a zero level (no ink) at each location. To create a non-white color patch on a white print medium, dots of one or more of these inks are deposited within the patch. The human visual system does not perceive the individual ink dots in the color patch, but rather perceives the spatial average color of the ink dots. Consequently, the color patch is perceived as having continuous tones when viewed through the human visual system.

A limited bit-depth output device can be modeled by a transfer function, which specifies the color produced from a given combination of primaries. For example, the transfer function of a four colorant printer might specify the color that results from printing with 20% magenta and 20% cyan. The transfer function provides a many-to-one mapping of primary space to desired color space, since different combinations of primaries can produce the same desired color.

The inverse transfer function specifies the relative amounts of primaries that produce a desired color. For example, the inverse transfer function of a four-colorant printer can specify the relative amounts of cyan and magenta to produce a desired shade of blue. Typically found during product development, the inverse transfer function of the four-colorant printer is used to convert continuous tone images into halftone images that can be printed by the four-colorant printer.

Finding the inverse transfer function is well established for four-color printers. The inverse transfer functions for four-color printers are derived empirically. A large knowledge base already exists for four color printers.

However, the large knowledge base does not extend to printers having more than four primaries, nor does it extend to limited bit-depth output devices other than printers. For limited bit depth output devices that have more than four primaries, additional information is needed. The additional information can be obtained by trial and error, and the inverse transfer functions can be determined by ad-hoc methods and empirical fixes. However, the trial error can be expensive and time consuming. The expense and time increases exponentially with an increase in the number of primaries.

Moreover, finding the inverse transfer function of a limited bit depth output device having more than four primary colorants is an ill-posed problem. The problem is ill-posed because the desired colors are usually expressed in three-dimensional space.

It would be desirable to mathematically determine the inverse transfer function of an output device having more than four primaries. High fidelity printers, which use more than four distinct primary colorants to obtain better color reproduction, are becoming more popular. Some high fidelity printers use CMYK, O(orange) and G(green) inks, others use CMYKO and V (violet) inks and still others use CMYK, R (red), G and B(blue) inks. Currently, inverse transfer functions for these high fidelity printers are determined by ad-hoc methods and empirical fixes. One advantage of the mathematical description is that it would reduce the amount of empirical trial and error and, thereby, increase the speed and reduce the cost of product development.

SUMMARY

According to one aspect of the present invention, an inverse transfer function of a limited bit depth output device having N primaries is determined. An N-dimensional hypercube that has been tessellated into a set of simplices is accessed, and the set of simplices is navigated through to select a subset that defines a one-to-one mapping of device-independent color space to device primary space.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 1 is an illustration of an output device having a limited bit depth, and device-independent color and device primary spaces for the output device.

FIG. 2 is a method of generating an inverse transfer function for a limited bit depth output device in accordance with an embodiment of the present invention.

DETAILED DESCRIPTION

Figure 3A:
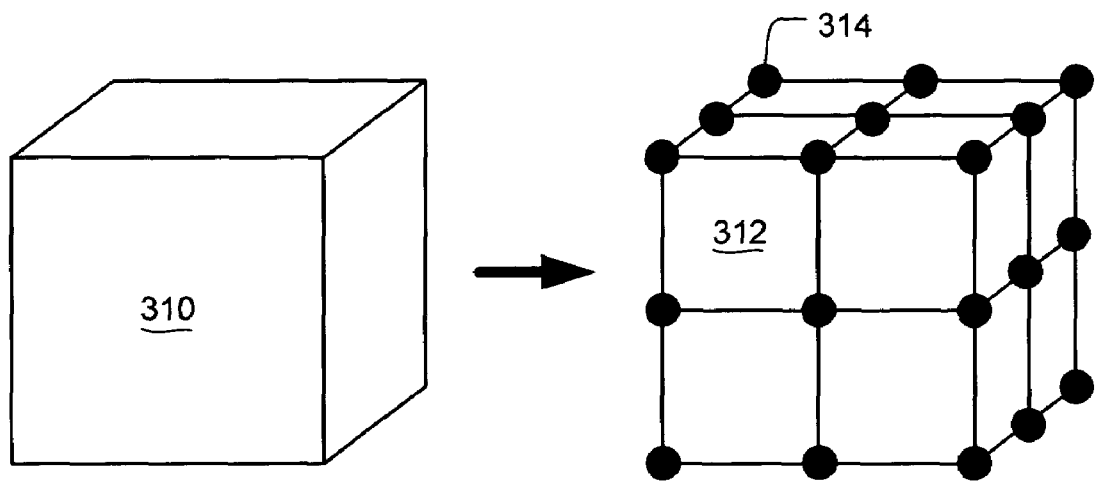
FIGS. 3a-3c are illustrations of a method of generating a three-dimensional tessellated hypercube.

As shown in the drawings for purposes of illustration, the present invention is embodied in methods of generating inverse transfer functions for output devices having limited bit depth. The methods, which are based on computational geometry, can be used for output devices having any number of primaries. Because the methods are based on computational geometry, and not ad-hoc methods or empirical fixes, they can reduce the amount of empirical trial and error and, thereby, increase the speed and reduce the cost of product development of limited bit depth output devices having more than four primaries.

Reference is made to FIG. 1, which illustrates an output device 110 having N primary colorants. The N primary colorants define a device primary space, which is denoted by $\Re^N$ An example of an output device 110 that has four primaries is a four-colorant printer that prints with cyan, magenta, yellow and black inks. An example of an output device that has six primaries is a printer that prints with C, M, Y, K Lc (light cyan) and Lm (light magenta). Another example of an output device that has $N \geqq 6$ primaries is a high fidelity printer.

The output device 110 is not limited to a printer. For example, the output device 110 could be a limited bit depth LCD screen.

A transfer function of the output device 110 determines the color in device-independent color space that will result from a specified combination of primaries. That is, the transfer function maps primary space of the output device 110 onto device-independent color space. The device-independent color space, which typically has three components, is denoted by $\Re^3$. The mapping of device-independent color space onto device primary space is denoted as $\Re^N z{,}901\ \Re^3$.

The device-independent color space describes color as perceived by the human visual system. Examples of device-independent color space include, without limitation, Lab and XYZ.

The inverse transfer function of the output device 110 determines relative quantities of primary colorants needed to obtain a desired color in device-independent color space. That is, the inverse transfer function maps device-independent color space ($\Re^3$) onto device primary space ($\Re^N$), or. $\Re^3 \Rightarrow \Re^N$.

If N>3, more than one N-tuple of primary colorants can create the same perceived color in device-independent color space. Thus, $\Re^3 \Rightarrow \Re^N$ is a one-to-many mapping for N>3.

The inverse transfer function is constrained to find the best N-tuple for a desired color. Thus the constrained inverse transfer function provides a one-to-one mapping of device-independent color space ($\Re^3$) onto device primary space ($\Re^N$).

Reference is made to FIG. 2, which illustrates a method of determining an inverse transfer function for an output device having N primaries. In block 210, a transfer function of the device is generated. Generating the transfer function may include using the device to output a batch of different colorant samples (block 212). The colorant samples may be provided in a grid structure. The vertices of this grid structure correspond to the colorant combinations that need to be measured.

The spacing of the grid structure may be uniform. Let $P=2^K+1$, where K is a positive integer and P denotes the number of grid points per dimension. The interval between two consecutive grid points along each dimension is $$\frac{\text{max\_colorant}}{P-1},$$

rounded off to the closest power of two. In 8-bit encoding, for example, the value of max_colorant is 255.

In block 214, the spectra of the samples are measured. The spectra may be measured with a spectrophotometer, which indicates that amount of light reflected for different wavelengths. For example, if the output device is a printer, the samples are printed as a grid on or more sheets of papers, and the spectra are measured. The measured spectra provide the richest information about what is on the paper.

In block 216, the measured spectra are converted to device independent color space. For example, an Lab value is determined for each sample.

In block 218, the color gamut of the output device is determined. The color gamut, which is the full range of colors that can be provided by the output device, is determined in independent color space (e.g., Lab). The color gamut may be computed by using a 3D convex hull algorithm to find the 3D convex hull of the measured Lab samples. The hull gives the totality of the all the colors that the output device can generate.

A constrained inverse transfer function is determined (220). The transfer function provides a many-to-one mapping of device primary space to device independent color space.

The inverse transfer function provides a one-to-many mapping of device independent color space to device primary space. However, the inverse transfer function is constrained to provide a one-to-one mapping. Thus going from a many-to-1 mapping to a one-to-one mapping constitutes an under-constrained optimization problem. The constrained inverse transfer function can be found by solving a mathematically under-constrained optimization problem.

Some of the constraints are derived from how the problem is solved. Examples of such constraints will be provided below.

Other constraints are application-specific and empirically derived. If the output device is a printer, for example, the constraints might include physical limitations of the printing process. For example, the printer might not be able to deposit more than a certain amount of ink on paper because the paper might not hold the ink well. Other printer constraints might be empirical. For example, test results might suggest that dark inks should not be deposited in light areas; otherwise, the areas will look noisy.

Another constraint could be a preference to use an expensive ink sparingly (e.g., orange ink in a high fidelity printer). Yet another constraint could be a preference to use the maximum amount of light colorants before using darker colorants, since a less noisy look would result.

In general, determining the constrained inverse transfer function includes accessing an N-dimensional hypercube that has been tessellated into a set of simplices (block 222); and, subject to the constraints, navigating through the set of simplices to obtain a subset that defines a one-to-one mapping of device-independent color space ($\Re^3$) to device primary space ($\Re^N$)(block 224).

Figure 3B:
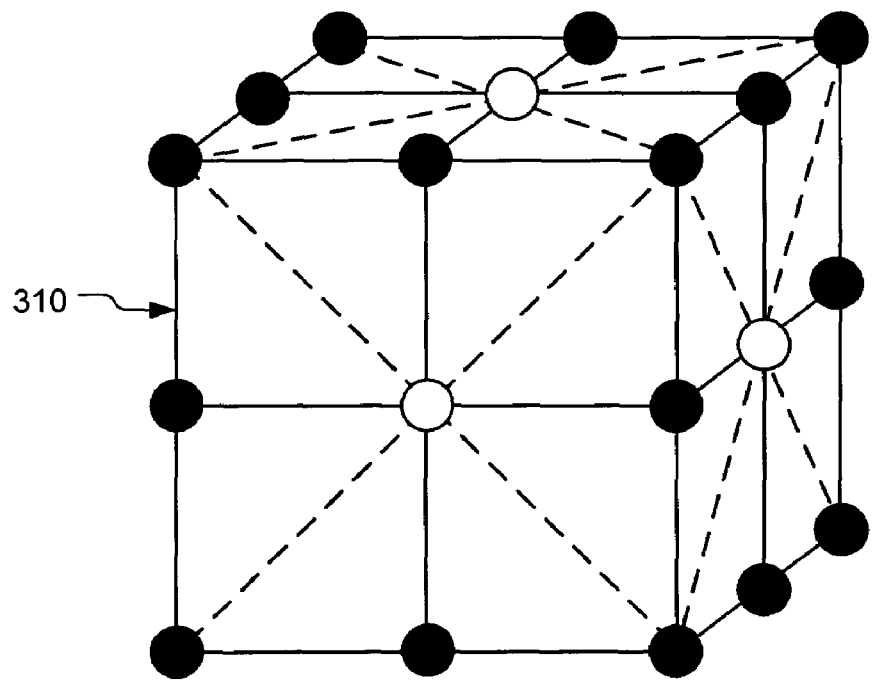
Figure 3C:
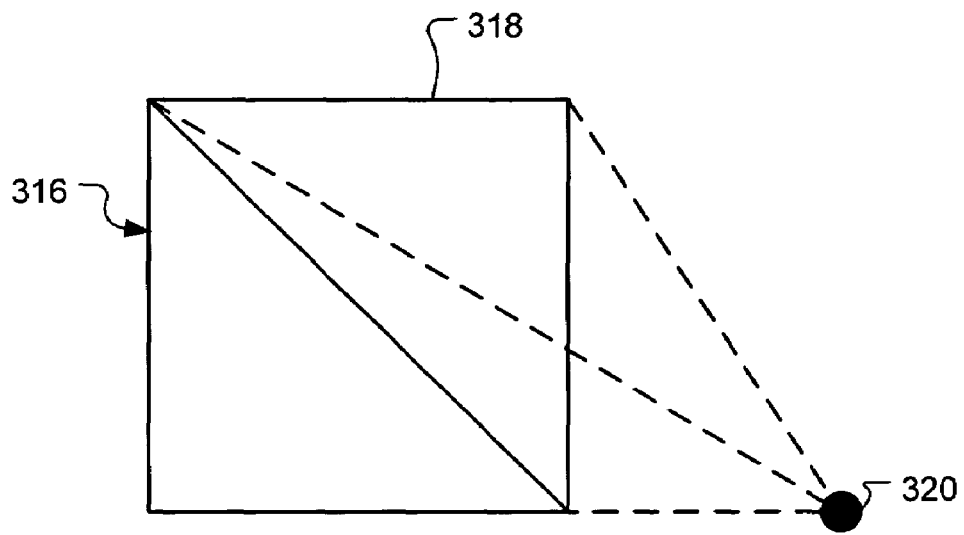

FIGS. 3a-3c illustrate the tessellation of a 3-D (primary) hypercube 310. Referring to FIG. 3a, the hypercube 310 is divided into $2^L$ smaller (secondary) hypercubes 312, by dividing each dimension (L) into 2. Each of these smaller hypercubes 312 contains $$\left(\frac{P-1}{2}\right)^L$$

grid points 314. Thus, a 3-D hypercube 310 corresponding to N=3 colorants is divided into eight smaller identical hypercubes 312.

Each smaller hypercube 312 is further subdivided until the primary hypercube 310 has $3^L$ grid points 314. Thus, the primary hypercube 310 is subdivided a total of $\log_2(P-1)-1$ times. As shown in FIG. 3a, the primary 3-D hypercube 310 is divided once in each dimension and has $3^3=27$ grid points 314.

Next, the faces of the primary hypercube 310 are found. Each secondary hypercube 312 has 2N faces. If N≧4, the faces of the secondary hypercubes 312 are also hypercubes. For N=4, the faces of the secondary hypercubes are 3-D hypercubes (i.e., cubes). As shown in FIG. 3a, the faces of a 3-D hypercube are 2-D hypercubes (i.e., squares). The 3-D hypercube has 2N=6 square faces.

Next, the barycenter of each face of the primary hypercube 310 is found. As shown in FIG. 3b, the barycenter of each square face of a 3D hypercube lies at the point with coordinates equal to the midpoint of the interval along each dimension. The barycenters are represented by open circles.

After finding the barycenter of each face, the barycenters are connected to the midpoints of the edges of the primary hypercube 310 and the corner vertices of the face (i.e., the remaining 8 grid points in the face). As shown in FIG. 3b, eight equal-sized triangles per face of the primary hypercube 310 are created. Such division of the square (a 2-D simplex) is referred to as a barycentric division. Since the primary 3-D hypercube 310 has six square faces, it has 6×8=48 equal-sized triangles.

Next 48 equal-sized tetrehedra are created. These tetrahedra are 3-dimensional simplices. The tetrahedra are created by connecting these triangles with the barycenter of the primary hypercube 310. The creation of a single tetrahedron is illustrated in FIG. 3c. A face of the primary hypercube 310 is referenced by numeral 316, the triangle used to create the tetrahedron is referenced by numeral 318, and the barycenter of the primary hypercube 310 is referenced by numeral 320. The lines connecting the triangle 318 to the barycenter 320 are shown in dash. After the 3D barycentric division has been performed, the hypercube 310 consists of a set of tetrahedra.

The tessellated hypercube represents device primary space ($\mathfrak{R}^N$). Each dimension of the hypercube corresponds to a primary and specifies an amount of the primary. One corner of the hypercube indicates no primaries (e.g., white) and a diagonal corner of the corresponds to maximum amounts of all colorants (e.g., blackish).

Each vertex of the tessellated hypercube representing the device primary space corresponds to a primary colorant combination. If the colorant combination corresponding to a vertex were to be printed, the printed color could also be expressed in the device independent color space. Therefore, each vertex of the tessellated hypercube representing the device primary space corresponds to a point in the device independent color space. Each tetrahedron has four vertices. Thus, the four vertices of each tetrahedron correspond to four points in the device independent color space. However, common device independent color spaces are three-dimensional. Since four points in 3-D space define a tetrahedron, for each tetrahedron in the device primary space there is a corresponding tetrahedron in the device independent color space. The full set of tetrahedra in the device primary space and the corresponding tetrahedra in the device independent color space form a many-to-one mapping because the same color in device independent color space can be represented by different tetrahedra.

The creation of the inverse transfer function is equivalent to finding the right set of colors in the tessellated hypercube.

Figure 4:
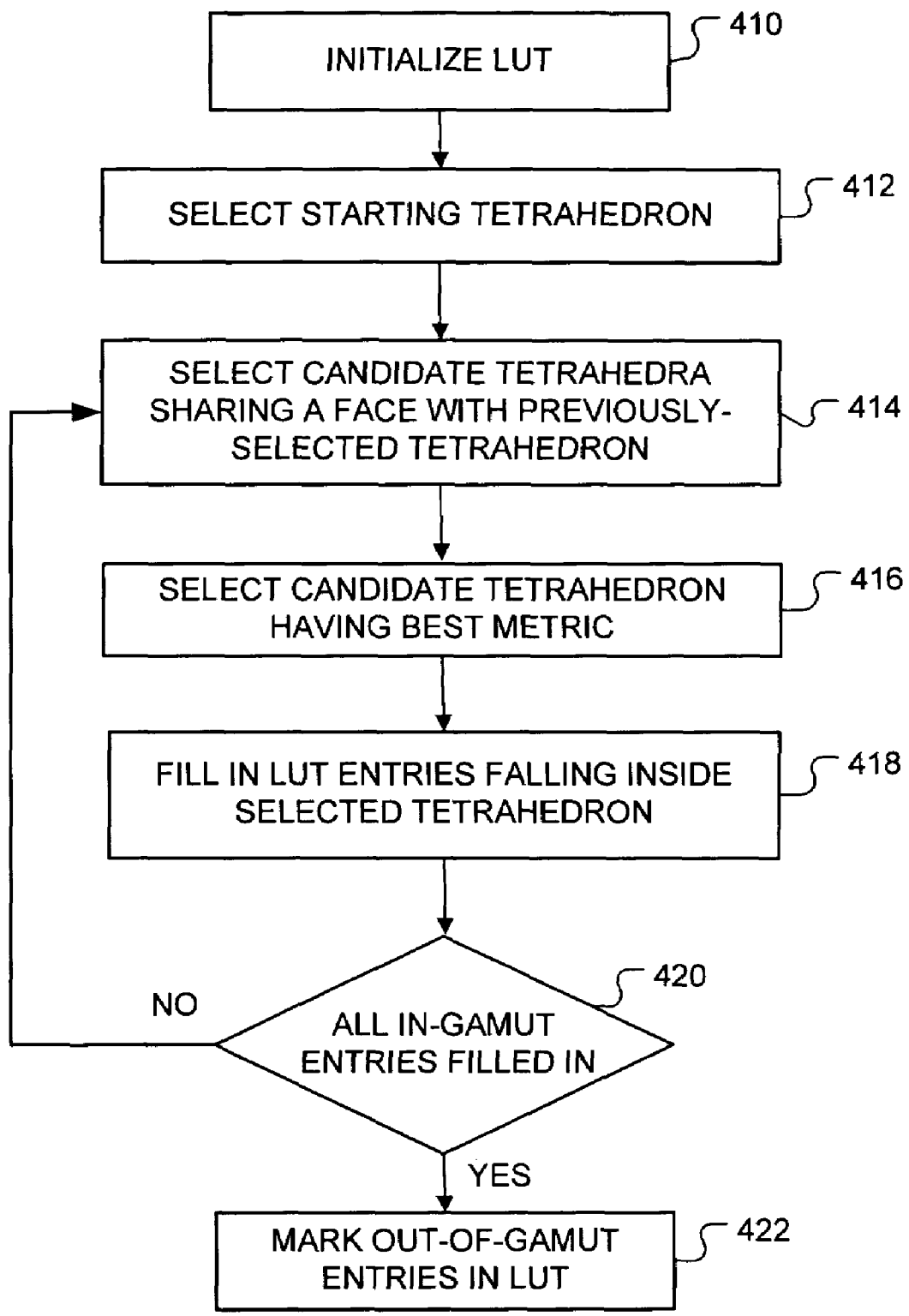
FIG. 4 is an illustration of a method of generating an inverse transfer function in accordance with an embodiment of the present invention.

FIG. 4 provides an exemplary method of navigating through the set of tetrahedra to obtain a subset that defines a one-to-one mapping of device-independent color space to device primary space. In block 410, a lookup table (LUT) is initialized. The LUT will be used to store the inverse printer transfer function. Values of L, a and b components of Lab space may be used as indices to the LUT. For example, the "L" values may go from 0 to 100, the "a" values may go from −127 to 128, and the "b" values may go from −127 to 128, all with a grid interval of 0.5. Resulting is a final Lab grid with 201×513×513 points. The grid interval of 0.5 is chosen because colors less 0.5 away in Lab space are not visually distinguishable.

In block 412, navigation through the tetrahedra may begin with the tetrahedron at the origin, where all the primary values are zero. This starting tetrahedron is certain to be in the one-to-one transfer function (which can be inverted). For a different application, another initial tetrahedron may be selected.

In blocks 414-416, the next tetrahedron is found. In block 414, candidate tetrahedra are selected. The candidate tetrahedra are all tetrahedra sharing a face of the previously-found tetrahedron. The vertices of each candidate tetrahedron define relative amounts of primary colorants.

In block 416, a metric is computed for each candidate tetrahedron, and the candidate tetrahedron having the "best" metric is selected. The metric provides a measurable way of selecting a candidate tetrahedron. For example, visual quality of each candidate tetrahedron can be measured. The visual quality of a candidate tetrahedron can be measured by as follows. The vertices of each candidate tetrahedron have a corresponding set of vertices in the grid of measured samples (which was determined in block 210). The volume of the candidate in Lab space is computed. Since Lab is almost perceptually uniform, the volume in Lab cubic units can be thought of as a measure of how different a color will appear to the human visual system. The higher volume in the device independent space will appear more different to the human visual system. Therefore, the tetrahedron having the lowest volume (the best visual quality) is selected.

Volume of a candidate tetrahedron is but one metric. Other metrics can be computed, and the candidate tetrahedron that maximizes or minimizes one or more of the metrics can be selected.

For each candidate tetrahedron in the primary color space that is selected, there is a corresponding tetrahedron in the device independent color space. Thus, by making a selection in primary space (i.e., selecting a candidate), the selection is also made in device independent color space.

For each selected tetrahedron, the LUT entries falling inside the corresponding tetrahedron are filled in (block 418). If the output device is a printer, all colors that fall into this corresponding tetrahedron in the device independent color space can be created by printing colorants combinations that fall into the selected candidate tetrahedron in the primary color space. By selecting a candidate tetrahedron in the primary color space, a decision is made to print a certain set of colors (the ones that fall into the corresponding tetrahedron in the device independent color space) with linear interpolations of the primary colorant combinations that are the vertices of the selected candidate tetrahedron. Therefore, when a tetrahedron in the primary color space is selected, all the grid points in the LUT are found that represent the device independent color space that fall into the corresponding tetrahedron in the device independent color space. For each such grid point, the primary colorant combination is found that will create the color of the grid point when printed by carrying out tetrahedral interpolation between the colorant combinations of the vertices of the selected tetrahedron in the primary color space and store it in the LUT.

The next candidate tetrahedra are found (block 414), the best candidate is selected (block 416), and the relevant entries in the LUT are filled in (block 418). The candidate tetrahedra share the face of the previously-found tetrahedron, and the candidate tetrahedron having the best metric is selected. Thus, the candidate tetrahedra are continuous so the transfer and inverse transfer functions are continuous. A continuous inverse transfer function can prevent discontinuities (i.e. false color edges and color jumps) in output images.

The navigation continues until all in-gamut LUT entries have been filled in (block 420). As determined by the convex 3D hull, some of the entries in the LUT are out of output device's color gamut (i.e. the output device cannot produce out-of-gamut colors in the grid structure). In block 422, those out-of-gamut entries grid points can be marked as such.

As additional tetrahedral are selected, additional entries in the LUT are filled in. Once all in-gamut entries have been filled in, the primary colorant combinations creating in-gamut color in the device independent color space are known. Hence, the inverse transfer function has been determined.

Figure 5:
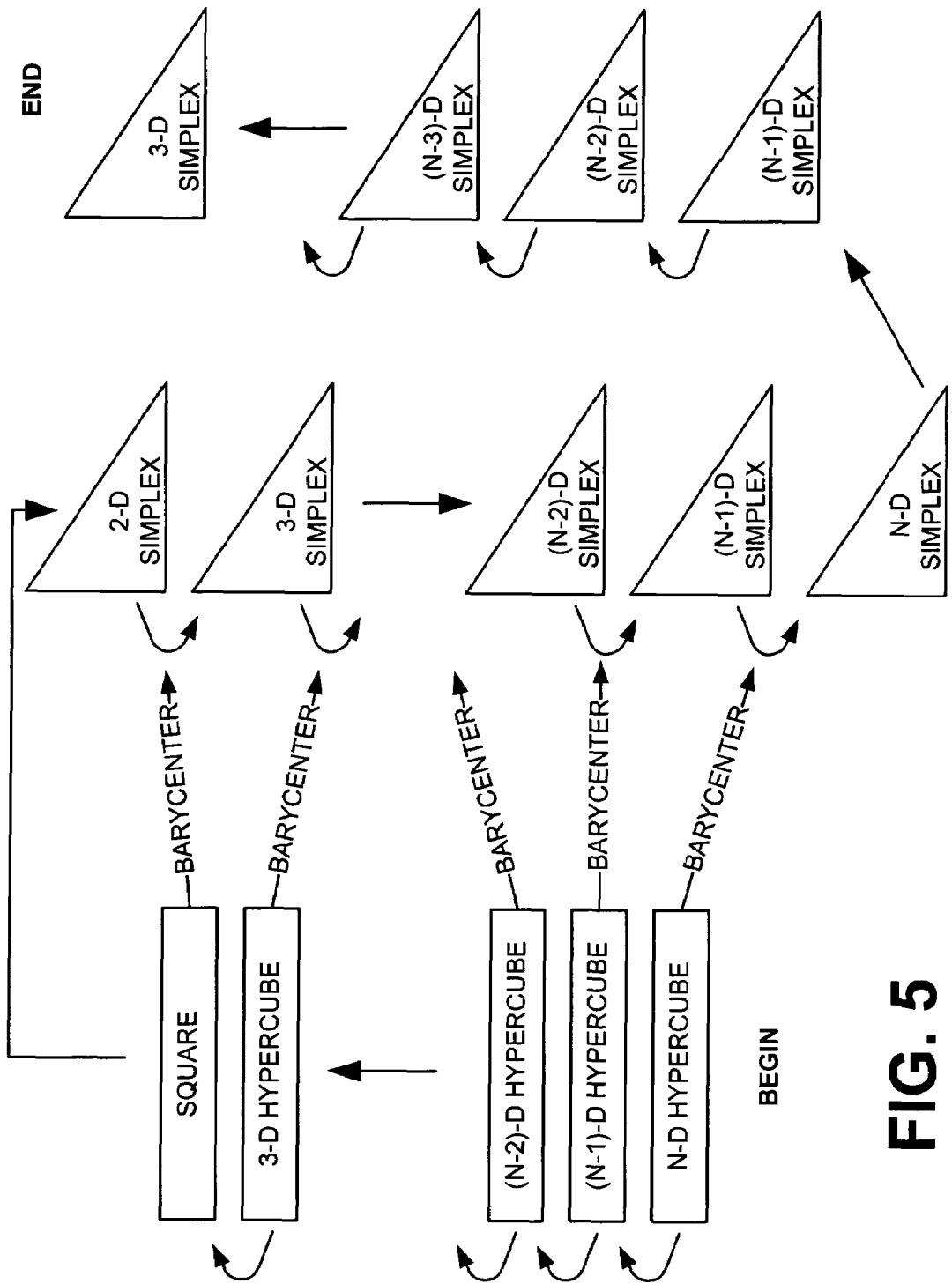
FIG. 5 is an illustration a method for extending the method of FIG. 2 to an output device having more than three primaries.

Reference is now made to FIG. 5. The method above can be extended to dimensions other than N=3. For the general case of N>3, the faces of the primary N-D hypercube is found. The faces are (N−1)-D hypercubes. The faces of the (N−1)-D hypercubes are found. Each face of an (N−1)-D hypercube is an (N−2)-D hypercube. Further iterations are performed until the faces are squares (i.e., 2-D hypercubes).

Next a barycentric division of the square faces into triangles is performed (as shown in FIG. 3b). These triangles are connected to the barycenter of the parent hypercube. Thus, the triangles in a square face are connected to barycenters to form tetrahedra (3-D simplices). These tetrahedra are connected to the barycenters of their parent hypercubes to form pentatopes (4-D simplices). These pentatopes are connected to the barycenters of their parent hypercubes to form hexatopes (5-D simplices). Additional iterations are performed until the (N−1) simplices are connected to the barycenter of the (N-D hypercubes. This completes the division of the N-D initial hypercube into N-D simplices.

Then the faces of the N-D simplices, which are (N−1)-D simplices, are found. Then the faces of the (N−1)-D simplices, which are (N−2)-D simplices, are found. Then the faces of these (N−2)-D simplices, which are (N−3)-D simplices, are found. Iterations are performed until the faces are 3-D simplices i.e. tetrahedra. This completes the creation of the tetrahedra (3-D simplices) for the N-D initial hypercube.

This tessellated N-Dimensional hypercube can be navigated as described above. Candidates sharing a face with a previously-selected tetrahedron are identified, and the candidate having the best metric is selected. The subset being grown is still three-dimensional. However, the available paths for the subset are greater in higher dimensions.

Figure 6:
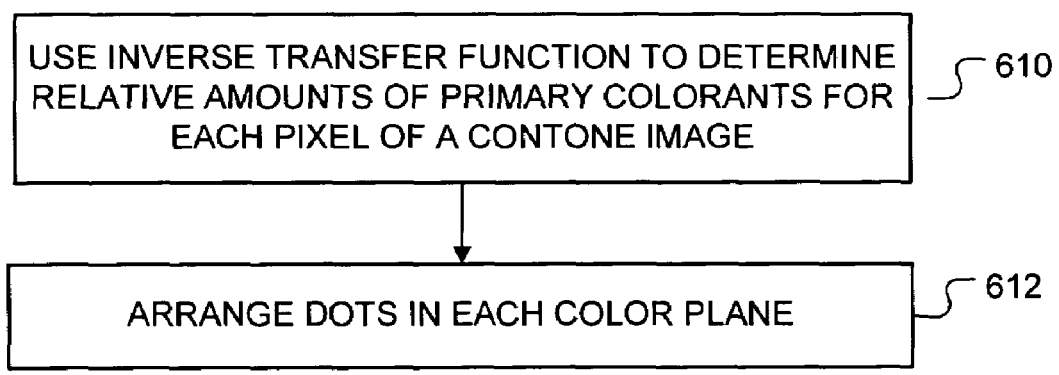
FIG. 6 is an illustration of using an inverse transfer function in accordance with an embodiment of the present invention.

Reference is made to FIG. 6, which illustrates a method of using the inverse transfer function during conversion of a color contone image to a plurality of monochrome halftone images. Each monochrome halftone image corresponds to a primary colorant of the output device.

In block 610, the inverse transfer function is used to define the relative amounts of primary colorants for each pixel of the contone image. If the color in the contone image is out-of-gamut, a gamut mapping algorithm can be employed to bring it in-gamut. If the pixel color does not have a matching entry in the table, the two nearest entries may be selected, and the relative amounts of primary colorants may be interpolated from the amounts in the two nearest entries.

For each monochrome halftone image, the patterns of pixels are arranged (block 612). The arrangement of pixels of a monochrome image is not limited to any particular halftoning method.

Figure 7:
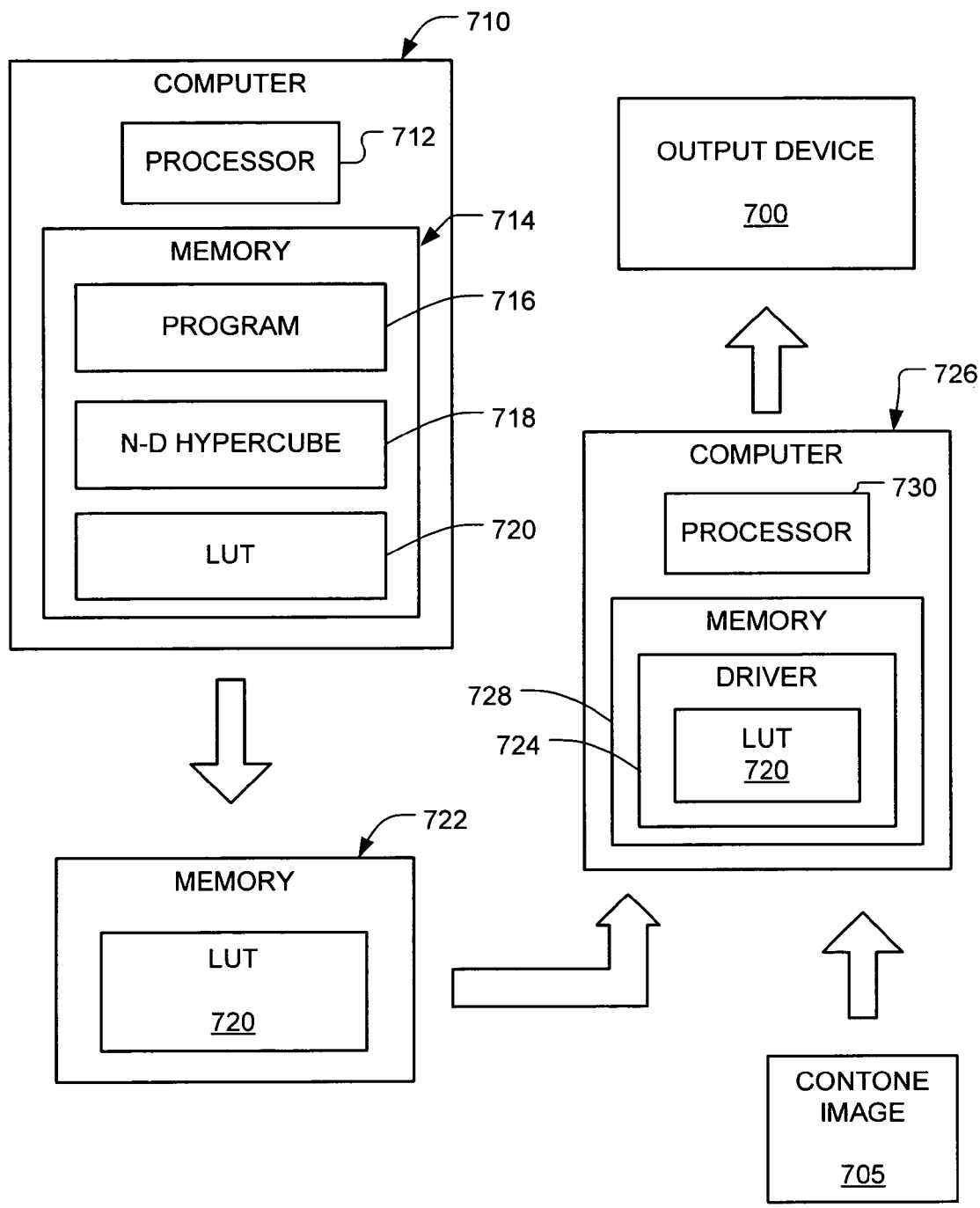
FIG. 7 is an illustration of a system in accordance with an embodiment of the present invention.

Reference is made to FIG. 7, which illustrates a system for generating and using an inverse transfer function according to the present invention. The inverse transfer function may be generated by a computer 710 including a processor 712 and memory 714. The memory 714 stores a program 716 for instructing the processor 712 to generate a transfer function of an output device 700, access an N-dimensional hypercube that has been tessellated into a set of simplices; and, subject to the constraints, navigate through the set of simplices to obtain a subset that defines a one-to-one mapping of device-independent color space to device primary space. The memory 714 may also store a data structure 718 corresponding to a tessellated N-dimensional hypercube. In the alternative, the data structure may be accessed from an external source.

The computer 710 may generate the inverse transfer function in the form of a lookup table (LUT) 720. The LUT 720 may be stored in memory 714, and distributed to other machines (e.g., electronically, via an optical disc 722).

The system allows the LUT to be found in a mathematical way, instead of empirical printing and testing. In the alternative, the system could be used to make an initial guess at a LUT, which could be refined through empirical printing and testing.

The LUT 720 may be distributed as part of a driver 724 for the output device 700. The driver 724 may be used by the computer 712 and other computers to convert contone images into halftone images that can be used by the output device 700.

FIG. 7 illustrates a second computer 726 for using the driver 724. The driver 724 may be stored in memory 728 of the second computer 726. When executed, the driver 724 instructs a processor 730 of the second computer to convert contone images 705 into halftone images that can be used by an output device 700. The second computer 726 sends the halftone images to the output device 700. In alternative, the output device 700 could use the driver to convert contone image into halftone images.

Although several specific embodiments of the present invention have been described and illustrated, the present invention is not limited to the specific forms or arrangements of parts so described and illustrated. Instead, the present invention is construed according to the following claims.

The invention claimed is:

1. A method of determining an inverse transfer function of a limited bit depth output device having N primaries, the method comprising:
   accessing an N-dimensional hypercube that has been tessellated into a set of simplices; and
   navigating through the set of simplices to select a subset that defines a one-to-one mapping of device-independent color space to device primary space.

2. The method of claim 1, wherein the subset of simplices is continuous.

3. The method of claim 1, wherein the simplices are navigated through subject to at least one constraint.

4. The method of claim 3, wherein at least one constraint is visual quality.

5. The method of claim 1, wherein selecting a simplex in the subset includes identifying at least two candidates; and selecting the candidate that has the best metric.

6. The method of claim 5, wherein the metric includes computing volume of the candidates in device-independent color space; and selecting the candidate that has the lowest volume.

7. The method of claim 1, further comprising determining a transfer function of the output device; and using the transfer function to navigate through the simplices.

8. The method of claim 1, wherein determining the transfer function includes using the output device to output a plurality of samples; measuring spectra of the samples; and converting the measured spectra to device independent color space.

9. The method of claim 8, further comprising using the measured spectra to determine a color gamut of the output device.

10. The method of claim 1, wherein the simplices are tetrahedra.

11. The method of claim 10, wherein if N>3, the simplices are broken down into tetrahedra prior to selecting the subset.

12. The method of claim 1, wherein navigating through the subset includes selecting candidate tetrahedral sharing a face with a previously-selected tetrahedron;

selecting the candidate having the best metric; and filling in a table with entries falling inside the selected candidate.

13. The method of claim 12, wherein filling in the table includes:

finding indices in the table that fall within the selected candidate; and finding entries for the indices by interpolating the entries from the vertices of the selected candidate.

14. The method of claim 1, wherein the output device is a printer.

15. Apparatus comprising a processor for generating an inverse transfer function according to the method of claim 1.

16. An article comprising memory encoded with data for causing a processor to generate an inverse transfer function according to the method of claim 1.

17. The article of claim 16, wherein the memory is further encoded with the tessellated N-Dimensional hypercube.

18. The article comprising memory encoded with a lookup table, the lookup table generated according to the method of claim 1.

19. The article of claim 17, wherein the memory is further encoded with data for causing a processor to generate a plurality of monochrome halftone image, relative amounts of colorant in each halftone image determined by the lookup table.

20. Apparatus for determining an inverse transfer function of a limited bit depth output device having N primary colorants, the apparatus comprising:

means for accessing an N-dimensional hypercube that has been tessellated into a set of simplices; and means for navigating through the set of simplices to select a subset that defines a one-to-one mapping of device-independent color space to device primary space.

21. Apparatus for determining an inverse transfer function of a limited bit depth output device having N primaries, the apparatus comprising a processor for navigating through a set of simplices of a tessellated N-dimensional hypercube to select a subset that defines a one-to-one mapping of device-independent color space to device primary space.

22. The apparatus of claim 21, wherein the subset of simplices is continuous.

23. The apparatus of claim 21, wherein the simplices are navigated through subject to at least one constraint.

24. The apparatus of claim 21, wherein the processor selects a simplex in the subset by identifying at least two candidates; and selecting the candidate that has the best metric.

25. The apparatus of claim 24, wherein selecting the candidate that has the best metric includes computing volume of the candidates in device-independent color space; and selecting the candidate that has the lowest volume.

26. The apparatus of claim 21, wherein if N>3, the simplices are broken down into tetrahedra prior to selecting the subset.

27. The apparatus of claim 21, wherein navigating through the subset includes selecting candidate tetrahedral sharing a face with a previously-selected tetrahedron;

selecting the candidate having the best metric; and filling in a lookup table with entries falling inside the selected candidate.

28. An article comprising memory encoded with data for causing a processor to determine an inverse transfer function of a limited bit depth output device having N primaries, wherein determining the inverse transfer function includes navigating through a set of simplices of a tessellated N-dimensional hypercube to select a subset that defines a one-to-one mapping of device-independent color space to device primary space.

29. The article of claim 28, wherein the subset of simplices is continuous.

30. The article of claim 28, wherein the simplices are navigated through subject to at least one constraint.

31. The article of claim 28, wherein selecting a simplex in the subset includes identifying at least two candidates; and selecting the candidate that has the best metric.

32. The article of claim 31, wherein selecting the candidate that has the best metric includes computing volume of the candidates in device-independent color space; and selecting the candidate that has the lowest volume.

33. The article of claim 28, wherein if N>3, the simplices are broken down into tetrahedra prior to selecting the subset.

34. The article of claim 28, wherein navigating through the subset includes selecting candidate tetrahedral sharing a face with a previously-selected tetrahedron;

selecting the candidate having the best metric; and filling in a lookup table with entries falling inside the selected candidate.

35. The method of claim 1, wherein the tessellated hypercube defines a non-invertible many-to-one mapping of device-independent color space to device primary space, and wherein the navigation is performed to constrain the tessellated hypercube to a one-to-one mapping.

* * * * *

UNITED STATES PATENT AND TRADEMARK OFFICE
CERTIFICATE OF CORRECTION

PATENT NO. : 7,483,171 B2 Page 1 of 1
APPLICATION NO. : 10/940076
DATED : January 27, 2009
INVENTOR(S) : Ufuk Agar et al.

It is certified that error appears in the above-identified patent and that said Letters Patent is hereby corrected as shown below:

In column 3, line 6, delete " $\mathfrak{R}^N_{z,901} \mathfrak{R}^3$ " and insert -- $\mathfrak{R}^N \Rightarrow \mathfrak{R}^3$ --, therefor.

Signed and Sealed this

Sixth Day of April, 2010

David J. Kappos
*Director of the United States Patent and Trademark Office*